United States Patent [19]
McGuigan

[11] Patent Number: 4,637,224
[45] Date of Patent: Jan. 20, 1987

[54] HUMIDITY REDUCTION DUCT

[76] Inventor: Brian G. McGuigan, P.O. Box 965, Eagar, Ariz. 85925

[21] Appl. No.: 670,046

[22] Filed: Nov. 13, 1984

[51] Int. Cl.⁴ ............................................. F25D 23/00
[52] U.S. Cl. ......................................... 62/271; 62/92; 62/94; 62/304
[58] Field of Search .................... 62/271, 304, 94, 93, 62/235.1, 92; 165/60; 55/34

[56] References Cited

U.S. PATENT DOCUMENTS

| | | | |
|---|---|---|---|
| 3,844,737 | 10/1974 | Macriss et al. | 62/271 |
| 4,227,375 | 10/1980 | Tompkins et al. | 62/271 |
| 4,287,721 | 9/1981 | Robison | 62/271 |

Primary Examiner—Henry Bennett
Attorney, Agent, or Firm—Richard R. Mybeck

[57] ABSTRACT

A humidity reduction duct assembly for attachment over the air inlet of an evaporative cooler having a tray assembly insertable therewith transversely thereacross intermediate the duct inlet and the cooler inlet so that air drawn through the duct passes across and through the tray assembly. The tray assembly is formed of a pair of spaced rigid members having a plurality of foraminous cylinders disposed therebetween in spaced parallel relationship to each other and filled with an air permeable desiccant. The duct removes excessive humidity from the ambient air and enhances the efficiency of the evaporative cooler.

15 Claims, 8 Drawing Figures

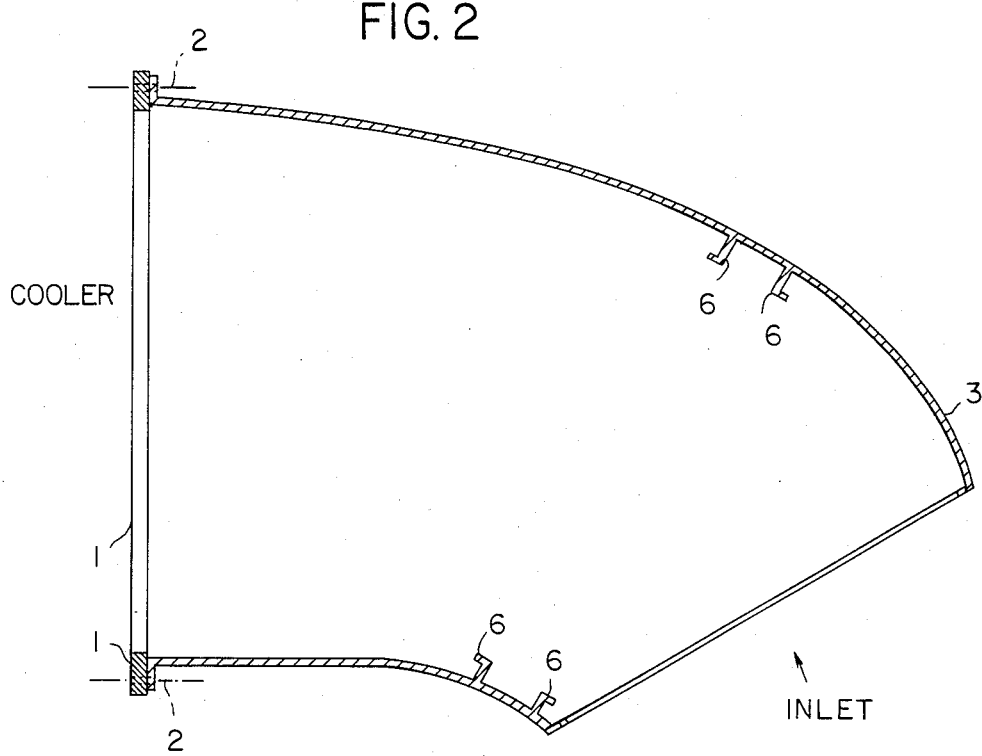
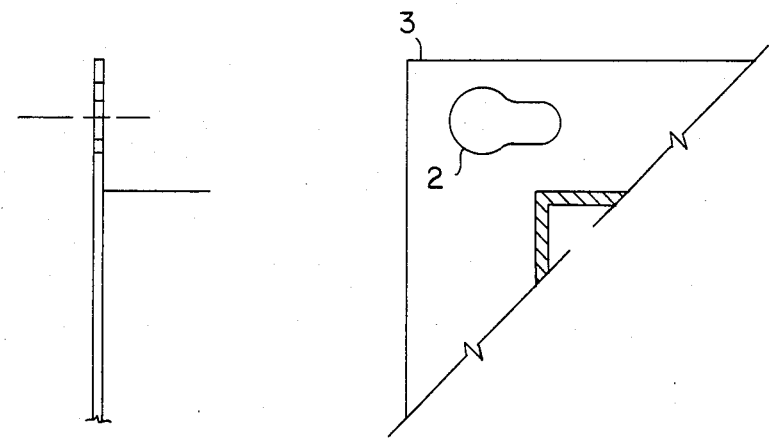

HUMIDITY REDUCTION DUCT

INTRODUCTION

The present invention relates to evaporative coolers and more particularly to a humidity reduction duct assembly for use therewith to reduce air borne contaminants introduced thereinto and enhance the cooling efficiency thereof during periods of relatively high ambient humidity.

BACKGROUND OF INVENTION

Large areas of the Southwest United States where evaporative cooling is either the sole, or primary method of cooling, for many residential or commercial buildings are effected by annual, and significant changes in the normally dry air. These changes are created by summer storms originating in Mexico and moving into the Southwestern United States, generally by late June. Commonly referred to as the "Monsoon Season" these storm conditions last from late June to early September and account for the majority of the annual rainfall in large parts of the Southwest; as well as accounting for a significant increase in humidity during those months, over the preceeding, and subsequent months, when evaporative cooling is used. The high humidity, combined with high temperatures, during the "Monsoon Season" markedly decreases the ability of evaporative coolers to provide room cooling, even with full-time usage. One way to alleviate the problem is to provide a means to reduce the external moisture content of air drawn into the evaporative coolers; thereby enhancing the evaporative cooling process.

A 3,400 CFM side-draft evaporative cooler will have three pads, each one having an area of approximately 28 inches by 28 inches. A cooler this size is designed, generally, for buildings under 1,300 square feet; larger buildings will require correspondingly larger coolers and pads. Generally, these coolers are mounted on roofs, for both the residential and commercial buildings. Because of their placement, and the direct exposure of the evaporative cooler pads to the atmosphere, evaporative coolers are prime locations for the deposit of airborne pollens, molds, and dirt. With the propensity of residents to introduce non-indigenous plants to metropolitan areas of the Southwest has come the associated problem of allergies. The pollen problem, in Tucson, Ariz. has risen to the point where Tucson now ranks among the top ten American cities in pollen count, according to the local NBC television affiliate; a paradoxical situation since many people have moved there from other parts of the country because of respiratory problems. One method to alleviate the problem of airborne pollen, mold, and dirt entering buildings equipped with evaporative coolers is to modify the coolers in such a manner as to reduce the amount of exposure the cooler pads receive directly from the atmosphere, and the prevailing winds.

During the late spring and early summers in the Southwest, specifically in Arizona, when evaporative cooling is in use, a drought-like weather condition exists. At these times birds seeking water will land on the pad frame louvers in order to drink water percolating down the louvers and pads and subsequently leaving feces and feathers in and on the evaporative coolers. There exists then a potential for the transmission of disease from the birds' feces to the interior of a room, with the evaporative cooler serving as the medium. The reservoir of water in the evaporative coolers is also treated in many cases with chemical additives designed to kill algae and dissolve mineral deposits. Birds drinking the percolating water from coolers treated with these additives also risk contamination of themselves and their eggs through ingestion. One option to remove the possibility of contamination to humans and birds is to modify the coolers in such a way as to deny birds access to the water passing over and through the pads and louvers, respectively.

SUMMARY OF THE INVENTION

An attachment designed to be fitted to each of the pad frames of down-draft and side-draft evaporative coolers.

The duct is mounted onto, and removed from, the evaporative cooler frame which surrounds the cooler pad. The duct extends from the cooler pad frame downward towards the base of the evaporative cooler.

Located within the attached duct, in proximity to the open end of the duct, is a tray which consists of cylinders holding an air permeable desiccant. These cylinders are arranged in two rows and extend across the length and width of the duct. In addition to the cylinders, the tray consists of a frame designed to hold the cylinders stationary.

The tray will be inserted, and removed, through an opening in the side of the duct. This opening will be flanged on either side to provide for a slot covering.

The distance between each cylinder in a row shall be equal to the diameter of the cylinders. The distance between the two rows shall be equal to the diameter of the cylinders, also. The cylinders in the two rows shall be arranged in an alternating pattern across the width of the duct.

Air is drawn into the open end of the attached duct by the action of the evaporative cooler's motor-driven blower drum. The air is then passed over and through the cylinders containing the desiccant, thereby reducing the moisture content of the air. The dried air is then drawn to the evaporative cooler pads where, in contact with water flowing through the pads, cooling by evaporation takes place.

Accordingly, a principal object of the present invention is to provide a new and improved humidity reduction duct assembly for use with evaporative coolers to reduce air borne contaminants introduced thereinto and enhance the cooling efficiency thereof during periods of relatively high ambient humidity.

Another object of the present invention is to provide a new and improved duct assembly for use with evaporative coolers which substantially reduces the introduction of airborne pollen, mold and dirt thereinto and denies the access of birds to the water flowing therein.

A still further object of the present invention is to provide a new and improved duct assembly for attachment to the air inlet of an evaporative cooler which duct assembly contains a plurality of foraminous cartridges strategically disposed transversely thereof and filled with an air permeable desiccant to remove excessive humidity from the inbound ambient air and enhance the efficiency of the evaporative cooler associated therewith.

These and still further objects as shall hereinafter appear are fulfiled in a remarkably unexpected fashion by the present invention as will be readily discerned from a careful consideration of the following detailed description of the preferred embodiments hereof, especially when read in conjunction with the accompanying drawing in which like parts bear like indicia throughout the several views.

BRIEF DESCRIPTION OF DRAWINGS

In the drawings:

FIG. 2 is a cross sectional view taken on the axial center line of FIG. 1;

FIG. 3A is a detail side view of the attachment slots for securing a duct assembly embodying the present invention to an evaporation cooler;

FIG. 3B is detail top view of the attachment slots for securing a duct assembly embodying the present invention to an evaporative cooler;

DESCRIPTION OF THE PREFERRED EMBODIMENTS

Figure 1:
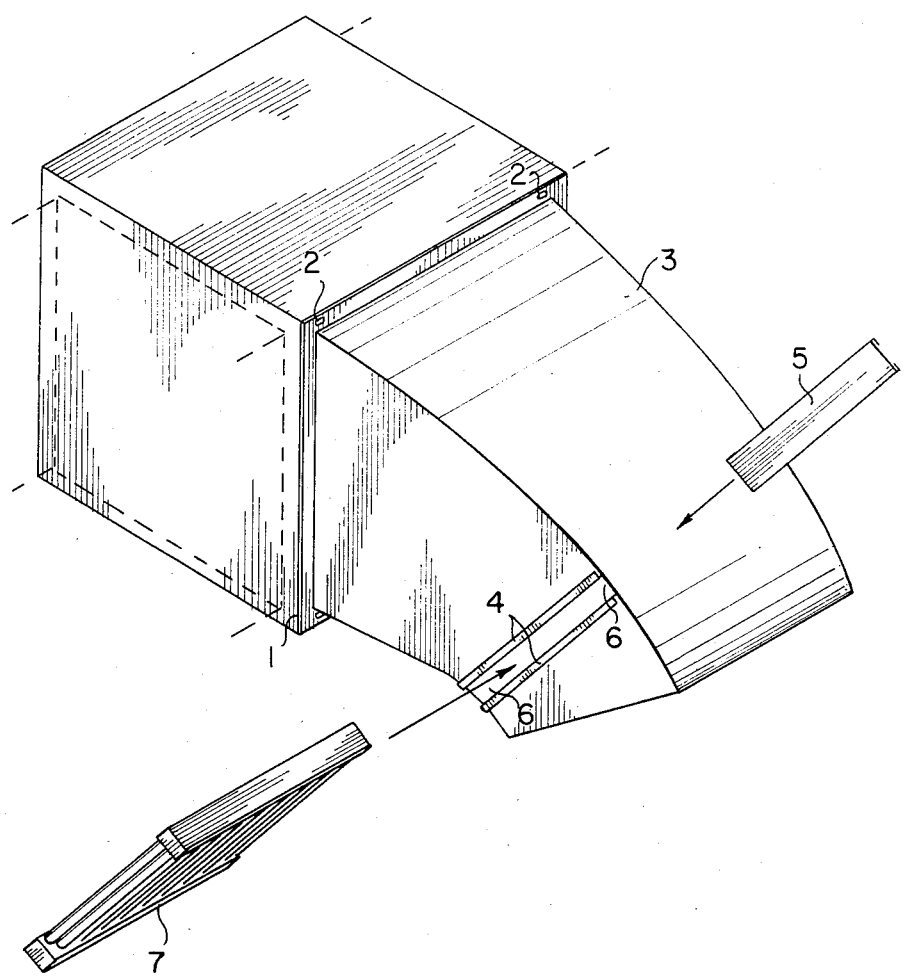
FIG. 1 is an isometric partially exploded view of a duct assembly embodying the present invention.
Figure 4:
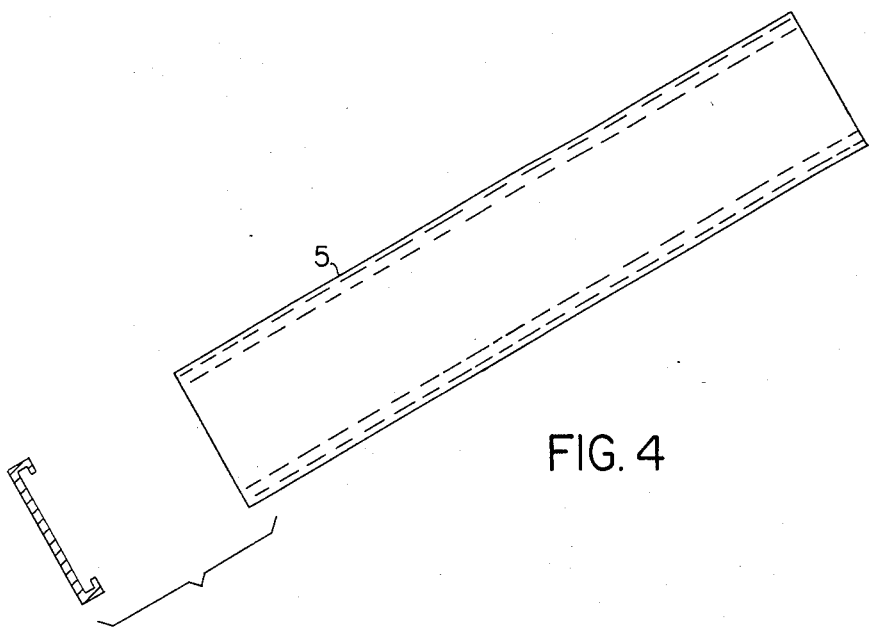
FIG. 4 is a plan view of a slot cover for use with the present invention.
Figure 5:
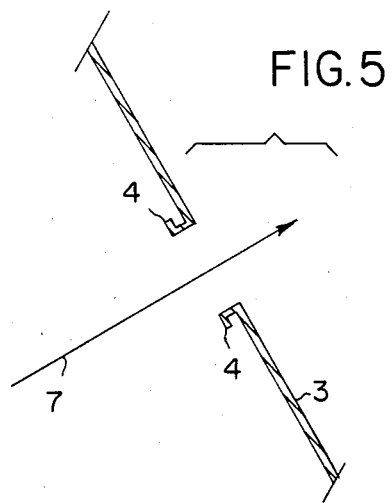
FIG. 5 is an enlarged cross sectional view of the slot cover guides in accordance with the present invention.
Figure 6:
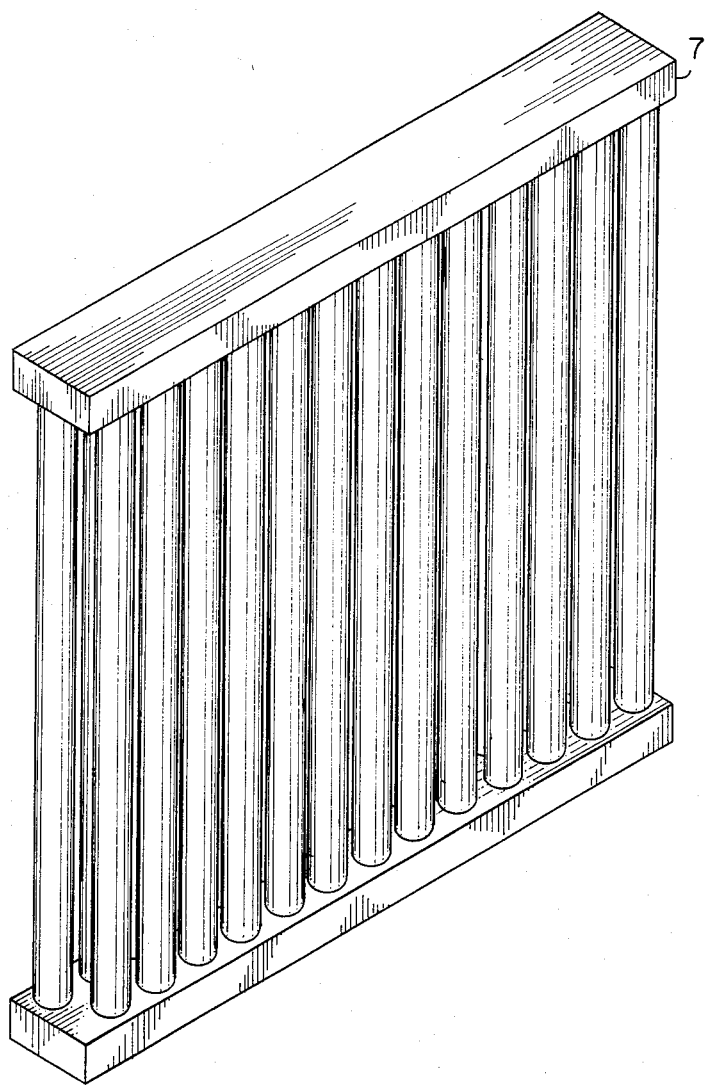
FIG. 6 is an isometric view of a desiccant tray embodying the present invention.
Figure 7:
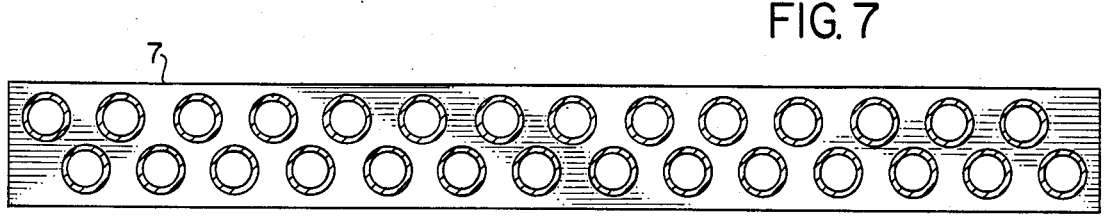
FIG. 7 is a cross sectional view of the tray in FIG. 6 taken along the horizontal center line thereof.

The structure of the duct assembly of the present invention will be such that the tray 7 containing the dehumidifying agent, extending across the opening of the duct will reduce the moisture content of the inflow of air. This air, drier than would be the case without modification of an evaporative cooler, is then drawn through the evaporative cooler pads where in contact with water flowing through the pads cooling takes place by evaporation. Thus, due to the drier air resulting from the dehumidifying agent in the duct assembly of the present invention, evaporative cooling is more effective than the standard, unmodified evaporative cooler currently in use.

The configuration of the duct assembly of the present invention, when in place, is such that airborne pollen, mold, and dirt carried on the prevailing winds is restricted entry into the evaporative cooler, as airflow is confined to the opening of duct 3 which opening faces downward toward the base of evaporative cooler and the roof. In addition, the opening of the attached duct will be smaller than the pad surface area of the evaporative cooler which will further decrease the volume of airborne pollutants entering, relative to the larger and more exposed surface of the evaporative cooler pads.

The duct assembly of the present invention, when mounted on the evaporative cooler, and which will encompass the evaporative cooler pads, along with the tray 7 containing the desiccant that extends across the internal width and depth of the duct 3 will provide an effective barrier to birds attempting to drink the water percolating through the pad frame louvers and over the pads. This removes the possibility of contamination of evaporative cooler water and room air through bird feces; and, of birds through drinking water treated with chemical additives that are used to kill algae and dissolve mineral deposits.

Thus, in summary, the duct assembly of the present invention is conceived as an improvement to existing, conventional evaporative coolers presently employed for residential and commercial room cooling by enhancing the cooler's ability to cool through use of a desiccant tray 7 by which air flowing over and through the cylinders containing the desiccant is dried before the air comes in contact with water to produce cooling by evaporation.

The duct 3 which provides a structural barrier to birds in the form of the desiccant tray and integral cylinders, will also prevent the possibility of contamination, from birds, of the water in the evaporative cooler; and concurrently remove the possibility of birds being contaminated through chemical additives used in evaporative coolers.

By its configuration and structural barrier mentioned above, duct 3 will also reduce the amount of airborne pollen, mold, and dirt entering an evaporative cooler.

Referring to the drawing in which like parts bear like indicia throughout the several views, the duct assembly of the present invention comprises several cooperating sub-assemblies which will now be described in detail.

Sub-assembly 1 is conforming material, foam rubber for purposes of this example, attached to the duct assembly of the present invention and providing for a seal between the duct and the surface area of the evaporative cooler frame.

Sub-assembly 2 consists of four slots for attachment by sheet metal screws of the duct to the evaporative cooler frame. For purposes of this example, the duct can be removed and installed by loosening the screws and turning the duct in a counter-clockwise motion or clockwise motion, respectively. The screws are secured, along with the duct, by tightening the screws to the cooler frame.

Sub-assembly 3 is the duct frame, which extends from the cooler pad frame area downward towards the base of the evaporative cooleer. Once secured to the cooler only one opening will exist—the mouth of the duct which will allow for the inflow of air.

Sub-assembly 4 consists of two flanged pieces on either side of the tray opening. These pieces serve as guides for the slot cover.

Sub-assembly 5 is the slot cover, designed to protect the desiccant tray from rain and dirt. The slot cover is positioned over the flanges (sub-assembly 4) and slipped along the length of the flanges for installation and removal.

Sub-assembly 6 consists of the guides used to position and stabilize the desiccant tray once inserted.

Sub-assembly 7 is the desiccant tray. Consisting of air permeable cylinders of a dehumidifying agent, e.g., activated carbon, sodium carbonate, or silica gel, and stabilized within a rigid frame. The desiccant tray consists of two rows of cylinders extending the internal width and depth o the duct.

More particularly, the duct assembly of the present invention, indicated by the general reference 10, comprises an elongated duct 11 tapering outwardly from its air inlet 12 to its air outlet 13 and attachable in registry with the air inlet 14 of a conventional evaporative cooler 15. A generally rectangular shape-conforming gasket 16 is operatively interposed between duct outlet 13 and cooler inlet 14 to effect a sealed engagement therebetween.

Duct 11, in most installations, will comprise a tapered elbow and provide an enclosed channel to guide ambient air from duct mouth 12 through duct outlet 13 into cooler inlet 14.

Intermediate duct mouth 12 and cooler inlet 14, and extending transversely of duct 11 is a slotted tray receiving means 17 cut through duct wall 18 to expose a first pair of L-shaped channel members 19 mounted to the inner upper surface 20 of duct 11 and a second pair of L-shaped channel members 21 mounted to the inner lower surface 22 of duct 11. The first pair and second pair of channel members, 19, 21, respectively, are disposed in space registered relationship to each other to complete tray receiving means 17.

Mounted adjacent tray receiving means 17 in the near side 18 of duct 11, on either side of the rectangular opening 23 cut therethrough for access thereto, is a third pair of L-shaped channel members 24, one extending vertically adjacent one edge of opening 23 and the other extending vertically adjacent the other edge of opening 23. A tray 25, hereinafter described in detail, once inserted in tray receiving means 17 for operative disposition transversely of duct 11, is enclosed by sliding slot cover 26 into channel members 24 so that the flat portion 27 thereof covers opening 23 and the L-shaped flange members 28 depending therefrom are respectively engaged by and secured one in each of channel members 24.

Tray 25 comprises a generally rectangular relatively rigid frame 30 having an upper frame member 31 and a lower frame member 32, each of which has a corresponding first row of circular seats 33 disposed uniformly along the leading edge 34 thereof and a corresponding second row of circular seats 35 disposed uniformly along trailing edge 36 thereof, each seat 35 being disposed in offset relationship between adjacent seats 33. Into each corresponding set of seats 33 and seats 35 is secured a foraminous cylinder 38 which is disposed at each end thereof into one of the corresponding pair of seats. Each cylinder 38 is filled with an air permeable desiccant selected from the group consisting of activated charcoal, sodium carbonate, and silica gel. The use of upper and lower to characterize rigid frame members 32, 32 is for reference only, it being apparent that the frame members can form the sides of the tray and foraminous cylinders 38 disposed horizontally therebetween without diminishing the effectiveness of tray 25.

To install duct assembly 10 upon a pre-existing evaporative cooler 15, gasket 16 is disposed about the cooler inlet 14 and duct 11 is engaged thereagainst and secured thereto by suitable fasteners. Cylinders 38 are appropriately filled with air permeable desiccant and installed into seats 33, 35 of frame members 31, 32 to form tray 25 which is inserted into tray receiving means 17 until tray 25 extends transversely completely across duct 11. Slot cover 26 is then placed into the slot cover guide defined by channels 24 to cover opening 23 and the assembly 10 is ready for use.

In operation, ambient air will be drawn into duct 11 through mouth 12 across tray 25 and through foraminous cylinders 38 allowing the desiccant disposed therein to withdraw substantially all of the excess moisture from the incoming air thereby enhancing the dryness of the air reaching evaporative cooler 15 thereby substantially increasing the cooling efficiency of the system.

From the foregoing it is readily apparent that a device has been herein described and illustrated which fulfills all of the aforestated objectives in a remarkably unexpected fashion. It is of course understood that such modifications, alterations, and adaptations as will readily occur to an artican confronted with this disclosure are intended within the spirit of the present invention which is limited only by the scope of the claims appended hereto.

Accordingly, what is claimed is:

1. A humidity reduction duct assembly for registered installation with the air intake of an evaporative cooler, said assembly comprising: an elongated tapered duct having an upper surface, a lower surface and a first and second side surface enclosing said upper and said lowr surface and defining therewith an inlet at one end thereof and an outlet at the other end thereof, said outlet being positionable in registered sealed alignment with the air intake of the evaporative cooler when said duct assembly is installed thereupon, and slotted tray receiving means operatively interposed between inlet and said outlet in said first side surface of said duct and extending transversely across the interior of said duct to terminate at said second side thereof; a tray assembly having a rigid upper frame member, a rigid lower frame member disposed in generally parallel relationship to said upper member, and a plurality of foraminous cylinders mounted between said upper frame member and said lower frame member in generally parallel spaced relationship to each other, each of said cylinders being filled with an air permeable desiccant, said tray assembly being slidably inserted into said tray receiving means and extending across said duct so that air flow from said duct inlet to said duct outlet passes therethrough; and cover means attachable to said first side of said duct over said tray receiving means to secure said tray assembly therewithin and enclose said first side of said duct.

2. A duct assembly according to claim 1 in which said tapered duct comprises a downwardly bent elbow.

3. A duct assembly according to claim 1 in which said air permeable desiccant is selected from the group consisting of activated carbon, sodium carbonate and silica gel.

4. A duct assembly according to claim 1 in which said duct has an upper inner surface and a lower inner surface and said tray receiving means comprises a first pair of L-shaped channel members secured to said upper inner duct surface transversely thereof and a second pair of L-shaped channel members secured to said lower inner duct surface in parallel spaced registered relationship to said first pair of L-shaped channel members.

5. A duct assembly according to claim 1 in which said rigid upper frame member and said rigid lower frame member each has a plurality of circular seats defined therein in spaced relationship to each other, each said seat in one member being disposed in facing registered relationship to a corresponding one of said seats in said other member to receive and hold a different one of said foraminous cylinders therebetween.

6. A duct assembly according to claim 5 in which said air permeable desiccant is selected from the group consisting of activated carbon, sodium carbonate and silica gel.

7. A duct assembly according to claim 5 in which said duct has an upper inner surface and a lower inner surface and said tray receiving means comprises a first pair of L-shaped channel members secured to said upper inner duct surface transversely thereof and a second pair of L-shaped channel members secured to said lower inner duct surface in parallel spaced registered relationship to said first pair of L-shaped channel members.

8. A duct assembly according to claim 5 in which said circular seats are disposed in a first and second row, said seats in said first row being positioned intermediate adjacent seats in said second row.

9. A duct assembly according to claim 8 in which said air permeable desiccant is selected from the group consisting of activated carbon, sodium carbonate and silica gel.

10. A duct assembly according to claim 8 in which said duct has an upper inner surface and a lower inner surface and said tray receiving means comprises a first pair of L-shaped channel members secured to said upper inner duct surface transversely thereof and a second pair of L-shaped channel members secured to said lower inner duct surface in parallel spaced registered relationship to said first pair of L-shaped channel member.

11. A duct assembly according to claim 4 in which said duct has a rectangular access opening defined in one side thereof to expose said first pair and said second pair of L-shaped channel members, said rectangular opening having a first and second upwardly extending edge, a first L-shaped channel member secured to said duct adjacent said first upwardly extending edge and a second L-shaped channel member secured to said duct adjacent said second upwardly extending edge, said first L-shaped channel member and said second L-shaped channel member coacting to receive said cover means therebetween.

12. A duct assembly according to claim 11 in which said rigid upper frame member and said rigid lower frame member each has a plurality of circular seats defined therein in spaced relationship to each other, each said seat in one member being disposed in facing registered relationship to a corresponding one of said seats in said other member to receive and hold a different one of said foraminous cylinders therebetween.

13. A duct assembly according to claim 12 in which said circular seats are disposed in a first and second row, said seats in said first row being positioned intermediate adjacent seats in said second row.

14. A duct assembly according to claim 13 in which said air permeable desiccant is selected from the group consisting of activated carbon, sodium carbonate and silica gel.

15. In combination with an evaporative cooler having an ambient air inlet and a cool air outlet, an assembly for reducing air borne contaminants introduced thereinto and enhancing the cooling efficiency thereof during periods of relatively high ambient humidity, said assembly comprising: a curvilinear inwardly tapered duct member detachably secured to said cooler in circumscription about said air inlet and extending outwardly and downwardly therefrom to a mouth laying in a plane angularly disposed relative to the plane of said air inlet, said duct member having slot means defined therein adjacent said mouth and extending transversely thereacross; sealing means operatively interposed between said duct member and said cooler member to prevent the ingress of air into said air inlet other than from said duct member; tray means having an upper frame member and a lower frame member in spaced cooperative relationship to each other to secure a plurality of foraminous disposable cylinders therebetween in spaced parallel relationship to each other, each of said cylinders being filled with a desiccant, said tray means being slidably insertable into for support by said slot means; and cover means having plate engaging flanges disposed on each edge of said slot means on the outer surface of said duct member and a plate means insertable within said plate engaging flanges to close said slot means when said tray means is placed therein.

* * * * *